(12) United States Patent
Sakai

(10) Patent No.: US 8,395,789 B2
(45) Date of Patent: Mar. 12, 2013

(54) MANAGEMENT APPARATUS AND INFORMATION PROCESSING METHOD

(75) Inventor: Tetsuo Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1120 days.

(21) Appl. No.: 12/327,373

(22) Filed: Dec. 3, 2008

(65) Prior Publication Data

US 2009/0161153 A1 Jun. 25, 2009

(30) Foreign Application Priority Data

Dec. 20, 2007 (JP) ................................. 2007-328723

(51) Int. Cl.
*G06F 15/00* (2006.01)
(52) U.S. Cl. .......................... 358/1.13; 358/1.15; 399/79
(58) Field of Classification Search ........................ None
See application file for complete search history.

(56) References Cited

U.S. PATENT DOCUMENTS

| 7,426,048 B2 * | 9/2008 | Sakai et al. .................. 358/1.14 |
| 2006/0259522 A1 * | 11/2006 | Nakamura ..................... 707/201 |
| 2007/0035638 A1 * | 2/2007 | Naitoh ........................ 348/226.1 |

FOREIGN PATENT DOCUMENTS

| JP | 2005-018400 A | 1/2005 |
| JP | 2005-222161 A | 8/2005 |
| JP | 2007-276408 A | 10/2007 |

* cited by examiner

*Primary Examiner* — Marivelisse Santiago Cordero
*Assistant Examiner* — Kent Yip
(74) *Attorney, Agent, or Firm* — Canon USA Inc IP Division

(57) ABSTRACT

A management server obtains, from an image forming apparatus whose counter type set to be displayed therein is determined to be obtainable, the counter information, specifies a counter type to be assigned in a table of commonly displayed counters specified on the basis of a plurality of counter types set to be displayed in a plurality of image forming apparatuses from the plurality of image forming apparatuses, assigns the counter type in the table of commonly displayed counters, and obtains counter information for the counter type assigned as the commonly displayed counter from an image forming apparatus whose counter type set to be displayed is determined to be unobtainable.

20 Claims, 16 Drawing Sheets

FIG. 8

| Counter No. | Description |
|---|---|
| 101 | Total |
| 103 | Total (Large) |
| 104 | Total (Small) |
| 108 | Total (Monochrome) |
| 203 | Copy (Large) |
| 201 | Copy |
| 222 | Copy (Small) |
| 229 | Copy (Color + Monochrome / Large) |
| 230 | Copy (Color + Monochrome / Small) |
| 232 | Copy (Color + Monochrome / Total) |
| 321 | Print (Color + Monochrome / Large) |
| 322 | Print (Color + Monochrome / Small) |
| 324 | Print (Color + Monochrome / Total) |
| ... | ... |

FIG. 9

| Number of Counter Types | 5 |
|---|---|
| Counter 1 to be Obtained | 101 |
| Counter 2 to be Obtained | 108 |
| Counter 3 to be Obtained | 201 |
| Counter 4 to be Obtained | 232 |
| Counter 5 to be Obtained | 324 |

FIG. 11

| Counter Type | 103 | 104 | 203 | 222 | 229 | 230 | 321 | 322 | ... | 1101 |
|---|---|---|---|---|---|---|---|---|---|---|
| Number of Set Devices | 4 | 1 | 4 | 1 | 4 | 1 | 4 | 1 | ... | 1102 |
| Ratio of Displaying Devices | 40% | 10% | 40% | 10% | 40% | 10% | 40% | 10% | | 1103 |

| Counter Type | 103 | 203 | 229 | 321 |

| Counter Type | 104 | 222 | 230 | 322 |

| Counter No. | Counter Capable of Substituting for |
|---|---|
| 103 | 104 |
| 203 | 222 |
| 229 | 230 |
| 321 | 322 |

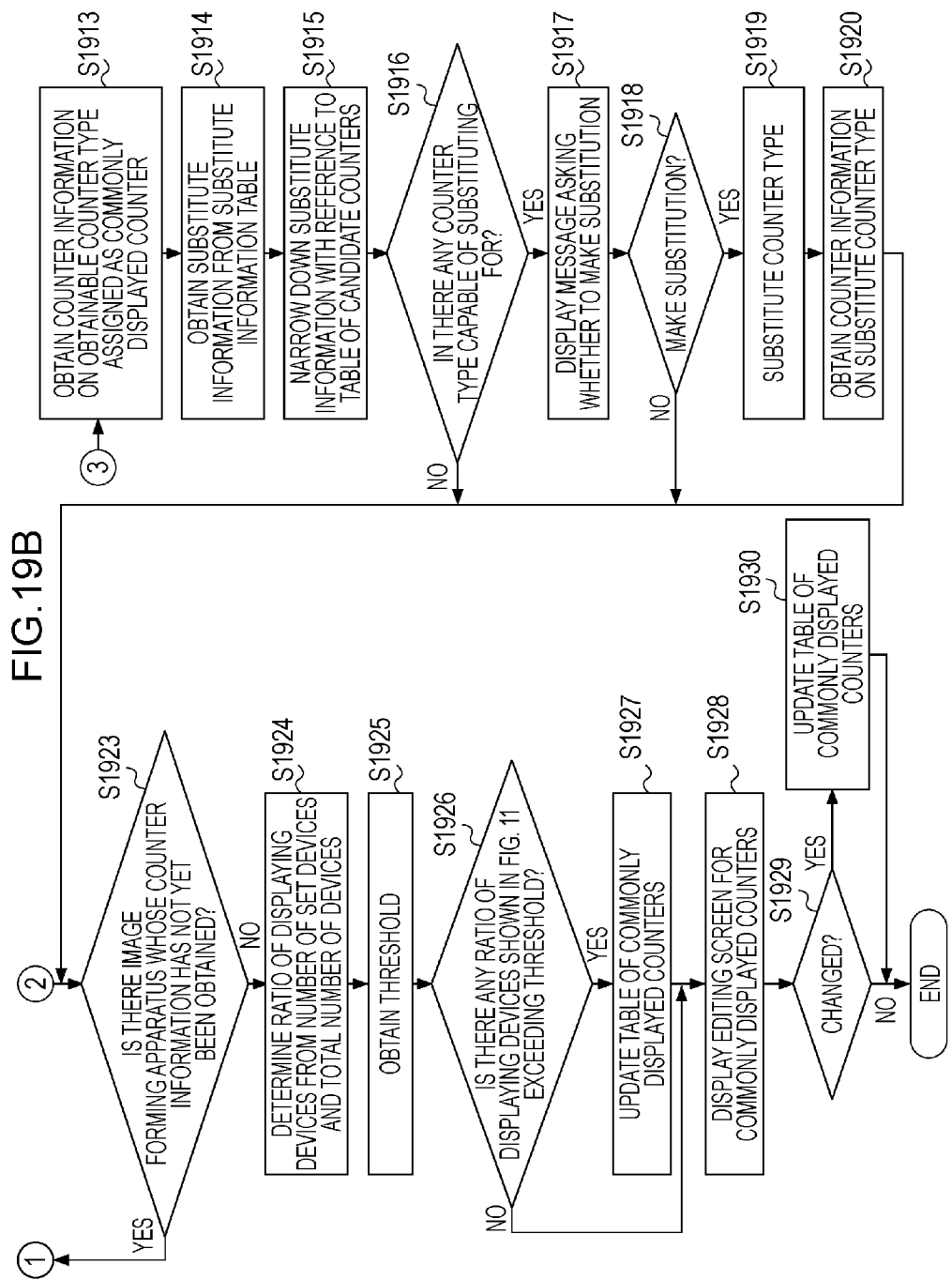

FIG. 21

| Counter Type | Dev1 | Dev2 | Dev3 | Dev4 | Dev5 | Dev6 | Dev7 | Dev8 | Dev9 | Dev10 |
|---|---|---|---|---|---|---|---|---|---|---|
| 101 | 4014 | 0105 | 0456 | 0720 | 1226 | 4014 | 0105 | 0456 | 0720 | 1226 |
| 108 | 2292 | 0088 | 0318 | 0448 | 130 | 2292 | 0088 | 0318 | 0448 | 130 |
| 232 | 1146 | 0043 | 0442 | 1156 | 256 | 1146 | 0043 | 0442 | 1156 | 256 |
| 324 | 1146 | 0036 | 0356 | 0326 | 118 | 1146 | 0036 | 0356 | 0326 | 118 |
| 201 | 0006 | 0012 | 0018 | 0115 | 664 | 0006 | 0012 | 0018 | 0115 | 664 |
| 103 | 100 | 0100 | 18 | 1050 | — | — | 0100 | 18 | 1050 | 25 |
| 203 | 110 | 0056 | 36 | 0760 | — | — | 0056 | 36 | 0760 | 50 |
| 229 | 120 | 0060 | 48 | 0230 | — | — | 0060 | 48 | 0230 | 55 |
| 321 | 130 | 0098 | 52 | 0166 | — | — | 0098 | 52 | 0166 | 64 |
| 104 | — | — | — | — | 25 | 22 | — | — | — | — |
| 222 | — | — | — | — | 50 | 33 | — | — | — | — |
| 230 | — | — | — | — | 55 | 56 | — | — | — | — |
| 322 | — | — | — | — | 64 | 66 | — | — | — | — |

MANAGEMENT APPARATUS AND INFORMATION PROCESSING METHOD

BACKGROUND OF THE INVENTION

1. Field of the Invention

The present invention relates to a management apparatus for acquiring and managing counter information, such as the number of sheets ejected, from an image forming apparatus (e.g., a printer or copier) and to an information processing method.

2. Description of the Related Art

One traditional method used in obtaining a counter value indicating, for example, the number of sheets printed (ejected) from a target device (image forming apparatus) in a print management system is a method of obtaining information on all counter types in the target device. Another method of obtaining information on a counter type instructed from a management server to a target device is disclosed in Japanese Unexamined Patent Application Publication No. 2005-222161.

Unfortunately, the above-mentioned methods have the problems described below.

Information on all counter types obtained from all devices involves unnecessary information, and this may cause an increase in network traffic.

If information items on counter types specified from a management server are obtained in a collective manner, the degree of flexibility in device management is reduced, for example, a counter value of a counter type unsuited for actual use in each base of management may be obtained or a counter value of a desired counter type may be unobtainable. This leads to a problem of reducing benefit to a user.

The actual use in each base of management indicates the usage in which a plurality of image forming apparatuses existing in the same base of management typically have shared counter types to be displayed on their respective local panels to some extent. A typical approach to obtaining and managing counter information on a counter type suited for such actual use is to obtain and manage a counter value of a counter type displayed on a local panel (hereinafter sometimes represented as a local user interface (LUI)) of a device. To achieve this, it is preferable that a counter type set to be displayed on a local panel be obtained for each device and counter information for the counter type be obtained.

However, depending on the facility of a target device, a low-functionality image forming apparatus or an earlier-model image forming apparatus may be unable to allow obtainment of a counter type displayed on its local panel. If there are both an image forming apparatus that allows obtainment of information on a counter type displayed on its local panel and an image forming apparatus that does not allow the obtainment, an unfavorable situation, such as the absence of counter information to be obtained from a low-functionality image forming apparatus, may occur. That is, it is difficult to obtain information on a counter type suited for actual use for each base of management.

SUMMARY OF THE INVENTION

The present invention provides a mechanism for enabling even an image forming apparatus that does not allow obtainment of a counter type displayed on its local panel to provide counter information being suited for actual use and corresponding to counter information in an image forming apparatus that allows obtainment of a counter type displayed on its local panel.

According to an aspect of the present invention, a management apparatus capable of communicating with an image forming apparatus that includes a display portion and that allows a user to observe, on the display portion, counter information for a counter type set to be displayed therein is provided. The management apparatus includes a counter information obtaining unit and a specifying unit. The counter information obtaining unit is configured to obtain counter information for a counter type set to be displayed in an image forming apparatuses from the image forming apparatus. The specifying unit is configured to specify a counter type of counter information to be obtained from an image forming apparatus that does not allow obtainment of a counter type set to be displayed therein, on the basis of a counter type obtained from an image forming apparatus that allows obtainment of a counter type set to be displayed therein. The counter information obtaining unit is configured to obtain the counter information for the counter type specified by the specifying unit from the image forming apparatus that does not allow obtainment of a counter type set to be displayed therein.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 illustrates an example of a correspondence between counter numbers and counter descriptions.

FIG. 9 illustrates an example of a table of common counters.

FIG. 11 illustrates an example of a table of displayed counters.

FIG. 21 illustrates an example of counter information items obtained and assembled according to one embodiment of the present invention.

DESCRIPTION OF THE EMBODIMENTS

Exemplary embodiments for carrying out the present invention are described below with reference to the drawings.

Figure 1:
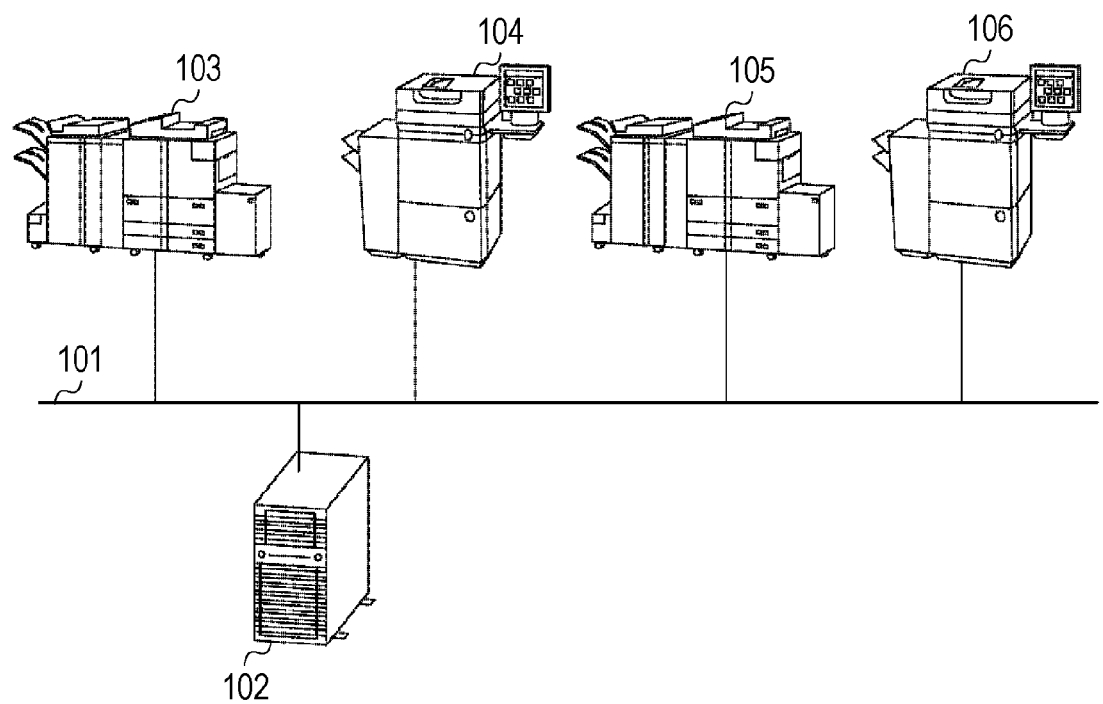
FIG. 1 is a concept diagram that illustrates a configuration of a management system in which one embodiment of the present invention operates.

FIG. 1 is a concept diagram that illustrates an example of a configuration of a management system in which one embodiment of the present invention operates, the management system managing image forming apparatuses.

A physical communication medium 101 is a transmission line through which a management server 102 and image forming apparatuses 103 to 106 managed by the management server 102 exchange data. The communication medium 101 can be, for example, Ethernet®. The management server 102 and the image forming apparatuses 103 to 106 are connected so as to be able to communicate with one another using the communication medium.

The image forming apparatuses 103 to 106, which are managed by the management server 102, can be a single function printer (SFP), which has only the printer function, or a multifunction peripheral (MFP). Each of the image forming apparatuses 103 and 105 is a low-functionality image forming apparatus that does not have the function of providing a counter type as counter information (at least a type and a counter value) displayed on its local panel. Each of the image forming apparatuses 104 and 106 is an image forming apparatus that has the function of providing counter information displayed on its local panel.

In the management server 102, an application program of a management system for image forming apparatuses is installed. The management server 102 is currently running. For the sake of simplification of the description, FIG. 1 illustrates an example that consists of one management server and four image forming apparatuses to be managed and that has a simple network structure. The system in itself may include a plurality of management servers. The number of image forming apparatuses to be managed and the network structure are not limited to particular ones.

Figure 2:
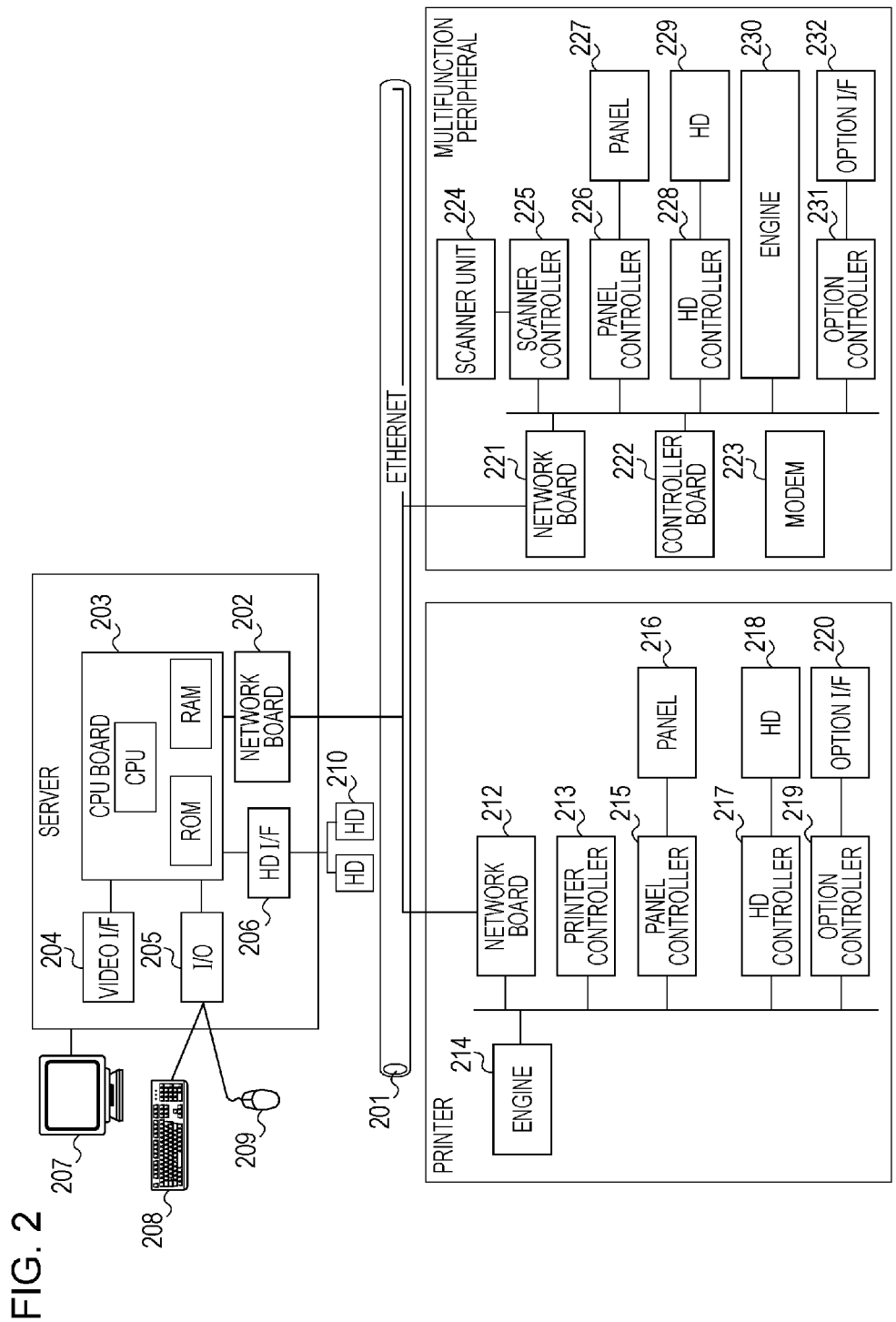
FIG. 2 illustrates a hardware configuration of apparatuses according to one embodiment of the present invention.

FIG. 2 illustrates main hardware modules in the apparatuses in the configuration illustrated in FIG. 1. Example functions of the hardware modules of the apparatuses are described below with reference to FIG. 2. In this drawing, a network medium 201 is a physical line constituting a network among the apparatuses. Typically, Ethernet® can be used as the network medium 201.

Example hardware modules constituting the management server 102 include a network board 202, a central processing unit (CPU) board 203, a video interface (I/F) 204, an input/output (I/O) interface 205, and a hard disk interface (HD I/F) 206. A cathode-ray tube (CRT) 207, a keyboard 208, a mouse 209, and a hard disk drive 210 are connected to the above modules. The hard disk drive 210 may include a plurality of hard disk units connected in parallel with one another to ensure high-speed performance in data transfer and high reliability. A database may be constructed in the hard disk drive 210, depending on the necessity for software operating on the management server.

Example hardware modules of the image forming apparatuses 103 to 106 illustrated in FIG. 1 include the elements 221 to 232 illustrated in FIG. 2 in the case of a MFP and the elements 212 to 220 illustrated in FIG. 2 in the case of an SFP. For a MFP, the example hardware modules include a network board 221 supporting peripheral equipment, a controller board 222, a modem 223, a scanner unit 224, a scanner controller 225, an operating panel controller 226, an operating panel 227, a hard disk controller 228, a hard disk (HD) 229, a print engine 230, an option controller 231, and an option I/F 232. Similarly, for an SFP, the example hardware modules include a network board 212 supporting peripheral equipment, a printer-function controller board 213, a print engine 214, an operating panel controller 215, an operating panel 216, a hard disk controller 217, a hard disk (HD) 218, an option controller 219, and an option I/F 220.

Figure 3:
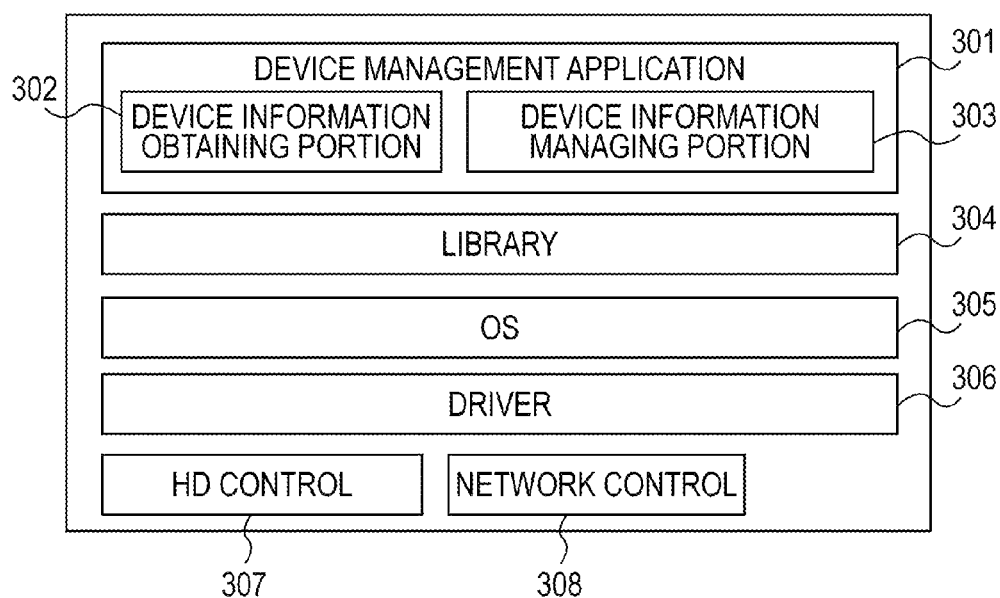
FIG. 3 illustrates a module configuration in a management server.

FIG. 3 illustrates a software module configuration in the management server 102 illustrated in FIG. 1.

A device management application (program) 301 includes a device information obtaining portion 302 configured to obtain counter information for an image forming apparatus being a device to be managed and a device information managing portion 303 configured to manage information for a device to be managed and counter information therefor. The device information obtaining portion 302 performs processing for obtaining necessary information, such as obtaining a counter type or obtaining counter information, from the outside through the network board 202 illustrated in FIG. 1 or other elements. One or more libraries 304 are provided by an operating system (OS) 305 and can be utilized as a framework function in construction of an application program. Driver software 306 is used to control hardware and includes a printer driver used in printing. Software components 307 and 308 are used to control physical media, for example, a hard disk and a network board, respectively. These modules enable device management software to operate on the management server 102 illustrated in FIG. 1.

Figure 4:
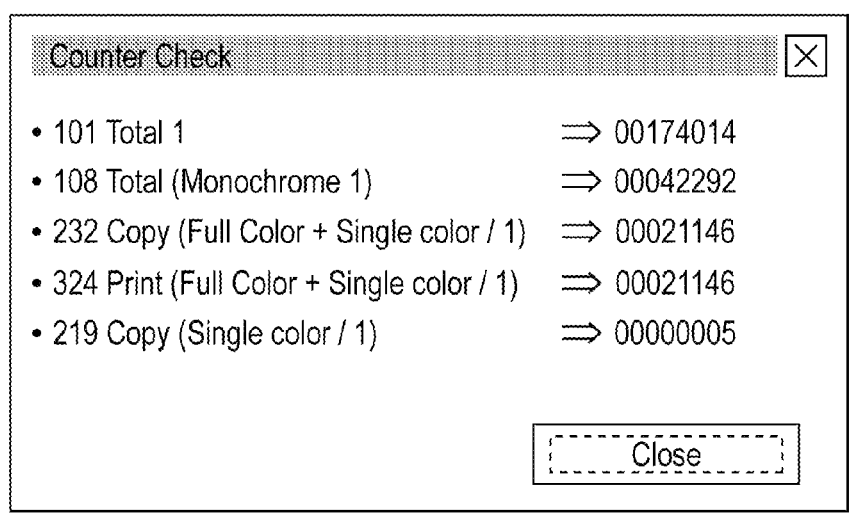
FIG. 4 illustrates an example of displaying of counter information set to be displayed on a local user interface (LUI) on a local panel in an image forming apparatus to be managed.

FIG. 4 illustrates information set to be displayed on a local panel of an image forming apparatus. The information indicates the size of sheets and the number of sheets output in output modes and represents the counter value for each counter. A displayed counter type here can be set using the panel 216 or 217 illustrated in FIG. 2 from, for example, a service mode.

Figure 5:
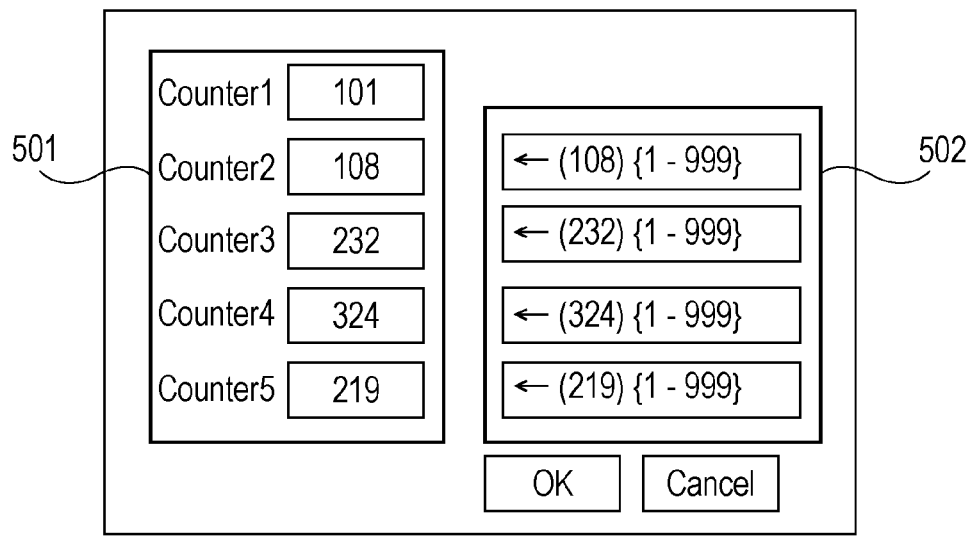
FIG. 5 illustrates an example of a setting screen used for setting counter information to be displayed on a local panel in an image forming apparatus.

FIG. 5 illustrates an example of a screen used for changing information on a counter displayed on a local panel from, for example, a service mode. In a region 501, the number of counters displayable on the local panel (counter 1 to counter 5) and example numerals indicating counter types currently displayed (101, 108, 232, 324, 219) are displayed. In this example, five counters are displayable. In this drawing, "101" of the counter 1 indicates the total counter, which is an unchangeable counter type in this example. A region 502 is used for selecting a counter to be changed from among counters set to be displayed. To select the counter to be changed, the counter number of the counter type to be selected is input using the panel 216 or 227 illustrated in FIG. 2.

Figure 6:
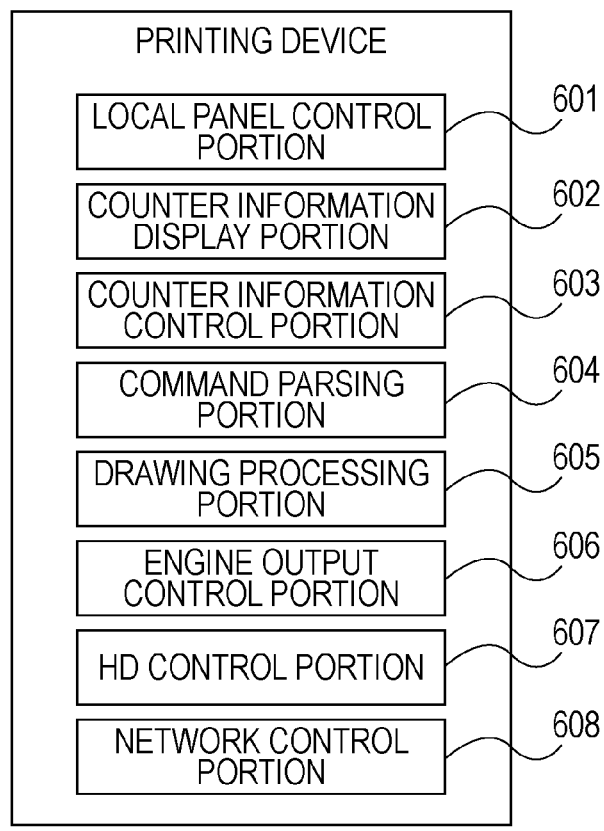
FIG. 6 illustrates a module configuration in an image forming apparatus.

FIG. 6 is a concept diagram that illustrates software modules in the image forming apparatuses 103 to 106 shown in FIG. 1. A local panel control portion 601 is a software module performing panel control processing installed in the operating panel controllers 215 and 226 illustrated in FIG. 2. A counter information display portion 602 is a software module performing processing of displaying counter information, as illustrated in FIG. 4. A counter information control portion 603 is a software module managing counter information in the image forming apparatuses, such as updating of counter information in printing out and transmission of updated counter information to the counter information display portion 602. A command parsing portion 604 parses a command of data to be printed transmitted from an external personal computer (PC) in printing out. A drawing processing portion 605 generates drawing data on the basis of a drawing command acquired by parsing performed by the command parsing portion 604. An engine output control portion 606 controls the print engines 214 and 230 illustrated in FIG. 2 for printing drawing data generated by the drawing processing portion 605. An HD control portion 607 controls the HDs 218 and 229 mounted in the image forming apparatuses. A network control portion 608 is mounted in the network boards 212 and 221 and performs processing for communication with an external PC or the management server 102.

When counter information displayed on the local panel illustrated in FIG. 5 is changed, information for the counter information display portion 602 is reset.

Figure 7:
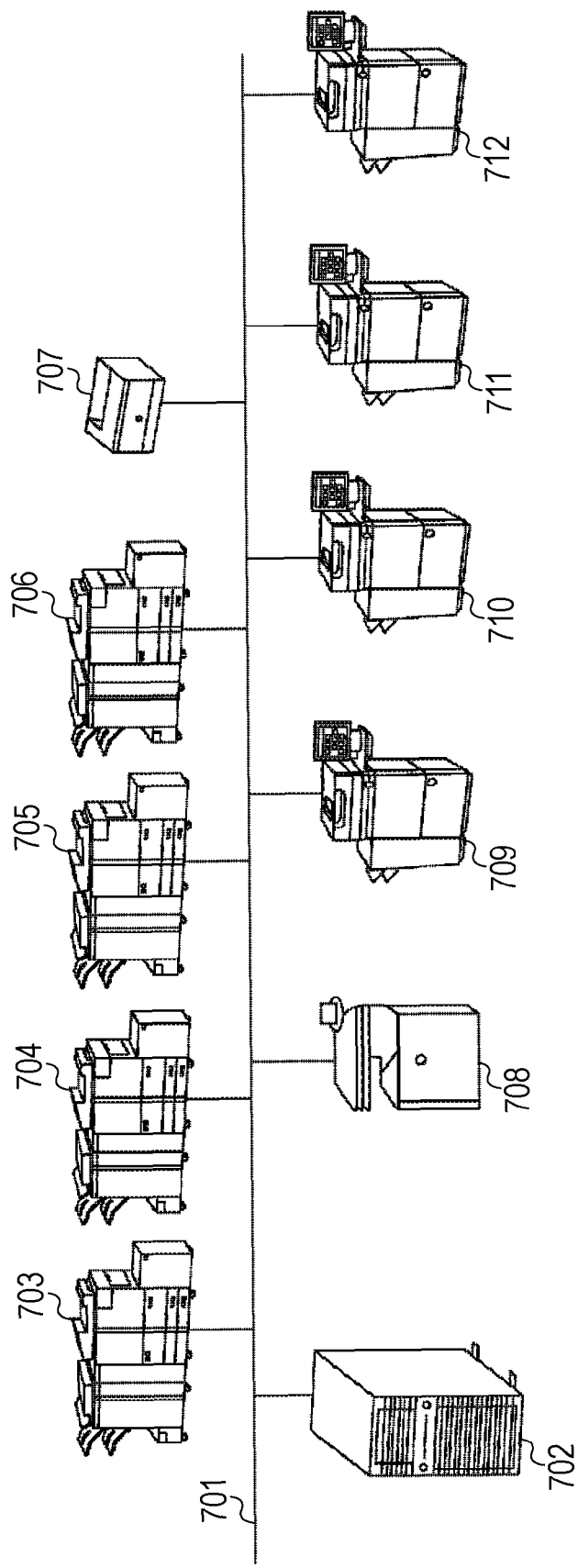
FIG. 7 illustrates a system configuration of a management system for an image forming apparatus according to one embodiment of the present invention.

FIG. 7 illustrates a configuration of a system for managing image forming apparatuses according to the present embodiment. A physical communication medium 701 is a transmission line through which a management server 702 and image forming apparatuses 703 to 712 managed by the management server 702 exchange data. The communication medium 701 can be, for example, Ethernet®.

Each of the image forming apparatuses 703 to 712 is managed by the management server 702 and can be an SFP, which has only the printer function, or a MFP.

Each of the image forming apparatuses 703 to 707 is a low-functionality image forming apparatus whose information on a counter type displayed on its local panel is unobtainable by the management server 702. The image forming apparatus 707 is an SFP that allows only printing on a small-size sheet.

Each of the image forming apparatuses 708 to 712 is an image forming apparatus whose information on a counter type displayed on its local panel is obtainable by the management server 702. The image forming apparatus 708 is an SFP that allows printing on a small-size sheet.

FIG. 8 illustrates an example of a correspondence between counter numbers and counter descriptions. The counter numbers are defined as those used in specifying a counter type using any three-digit number. Example descriptions for the counter numbers are "total, "copy," and "print", as indicated in the descriptions illustrated in FIG. 8. "Total" represents the total counter number (the number of sheets actually output in total). "Copy" represents the number of copies. "Print" represents the number of printouts from the printer function. As example attributes for classifying counter types in detail, keywords, such as "large/small," which is used for identification using the size of a sheet, and "color/monochrome," which is used for distinguishing between color printing and monochrome printing, are set. In FIG. 8, in order to flexibly manage the number of printing, various counter types generated by combinations based on these information items are defined by assignment of counter numbers. Specifically, the counter number 103 represents a type of a counter that retains a total counter value for outputting on large-size sheets. The counter types can be defined in various ways.

FIG. 9 illustrates an example of a table for managing common-counter information used to collectively obtain information on a counter type independent of color, monochrome, sheet size, and the like from all target devices to be managed. The information of this table is referred to by the device information managing portion 303 of the device management application (program) 301 installed in the management server 102. That information is loaded into a main storage area from an HD of the server PC as needed and is referred to as necessary.

Figure 10:
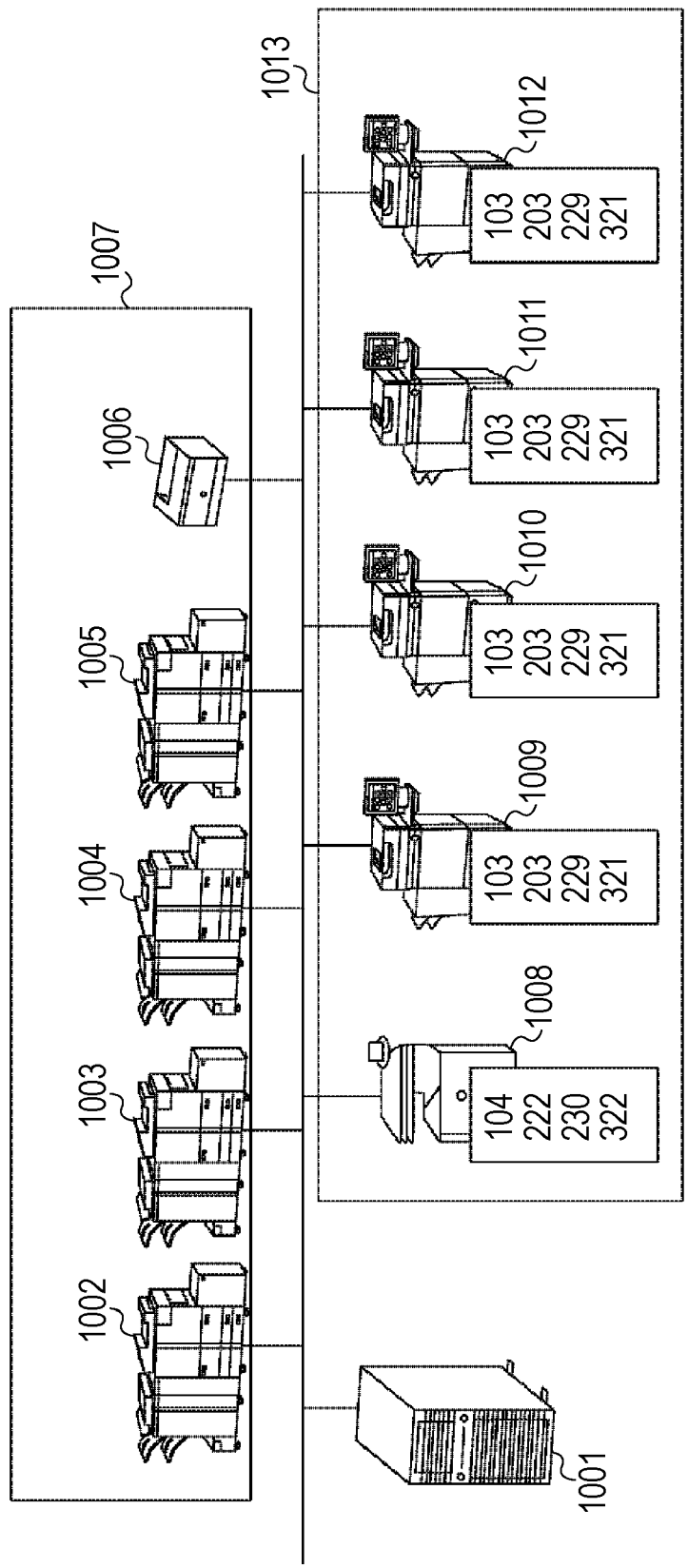
FIG. 10 illustrates a system configuration in the configuration illustrated in FIG. 7 when counter information to be displayed on a local panel of an image forming apparatus is set.

FIG. 10 illustrates a system configuration when a counter capable of being set to be displayed on a local panel is changed in the configuration illustrated in FIG. 7. A management server 1001 is running in the system according to the present embodiment.

Each of image forming apparatuses 1002 to 1006 is a low-functionality image forming apparatus whose information on a counter type displayed on its local panel is unobtainable by the management server 1001. The image forming apparatus 1006 is an SFP that allows only printing on a small-size sheet. These low-functionality image forming apparatuses are classified as a target-device group 1007.

Each of image forming apparatuses 1008 to 1012 is an image forming apparatus whose information on a counter type displayed on its local panel is obtainable by the management server 1001. The image forming apparatus 1008 is an SFP that allows only printing on a small-size sheet. These image forming apparatuses, whose information on a counter type set to be displayed on their respective local panels is obtainable, are classified as a target-device group 1013.

In the target-device group 1013, example counter types set to be displayed on its local panel of the image forming apparatus 1008 are as follows: total (small) 104; copy (small) 222; copy (color+monochrome/small) 230; and print (color+monochrome/small) 322. These settings are displayed on the local panel of the image forming apparatus 1008 (see FIG. 8).

In the image forming apparatuses 1009 to 1012, the counters set to be displayed on their respective local panels can be as follows: total (large) 103; copy (large) 203; copy (color+monochrome/large) 229; and print (color+monochrome/large) 321, as illustrated in FIG. 10.

FIG. 11 illustrates an example of a table of displayed counters when information on counter types displayed on respective local panels is obtained from the target-device group 1013 illustrated in FIG. 10 managed by the management server 1001.

In a region 1101, the numbers identifying counter types set to be displayed on the LUI obtained from the target-device group 1013 are stored.

In a region 1102, information indicating the number of image forming apparatuses that set displaying of the counter types shown in the region 1101 in the target-device group 1013 is stored. Specifically, FIG. 11 shows that, in the target-device group 1013, four image forming apparatuses set displaying of information on a counter identified by the counter number 103.

In a region 1103, the ratio of image forming apparatuses that set displaying of a counter type of interest to the sum of the number of target devices in the target-device group 1007 and the number of those in the target-device group 1013 (i.e., the total number of image forming apparatuses in the system) is shown in percentage.

Figure 12:
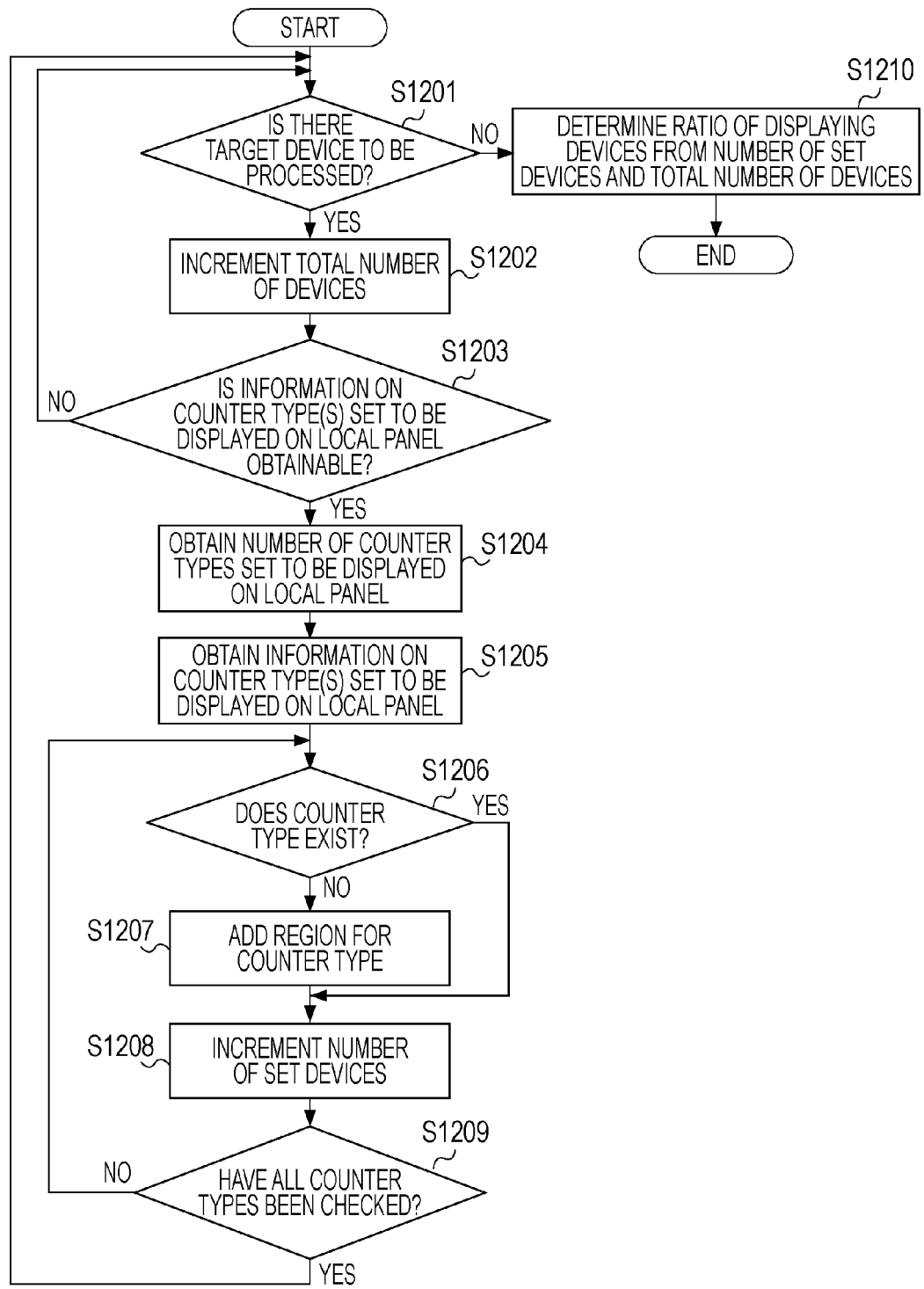
FIG. 12 is a flowchart based on a process for generating a table of displayed counters.

A process for generating the table illustrated in FIG. 11 performed in the management server is described below using the flowchart illustrated in FIG. 12.

In step S1201, the device information obtaining portion 302 determines whether there is an image forming apparatus to be processed (target device) in the system. If it is determined that there is a target device (YES in step S1201), flow proceeds to step S1202. If it is determined that there is no target device or processing for all target devices in the system has been completed (NO in step S1201), flow proceeds to step S1210.

In step S1202, the device information obtaining portion 302 increments the total number of image forming apparatuses to manage the number of devices to be processed, and flow then proceeds to step S1203.

In step S1203, the device information managing portion 303 determines whether the target device is an image forming apparatus whose information on one or more counter types set to be displayed on the local panel is obtainable. More specifically, for example, the device information managing portion 303 determines whether the target device is an image forming apparatus belonging to the target-device group 1007 or that belonging to the target-device group 1013. One example method used in the determination is a method of obtaining attribute information of the target device by, for example, referring to a management information base (MIB) object of the target device and making the determination using the obtained information in the device information managing portion 303. If it is determined that the information on the counter types displayed on the local panel is obtainable (YES in step S1203), flow proceeds to step S1204. If it is determined that the information on the counter types displayed on the local panel is unobtainable (NO in step S1203), flow returns to step S1201.

In step S1204, the device information obtaining portion 302 obtains the number of the counter types set to be displayed on the local panel of the target device, and the device information managing portion 303 retains and manages it. This processing is performed to find the number of types of counter information set to be displayed.

In step S1205, the device information obtaining portion 302 obtains the information on the counter types displayed on the local panel of the target device, and the device information managing portion 303 retains and manages it.

The processing from steps S1206 to S1209 is performed for the number of the counter types obtained in step S1204, that is, is repeated until all the obtained counter types are processed.

In step S1206, the device information managing portion 303 determines whether information on one of the counter types obtained and retained in step S1205 (currently processed counter type) has already been assigned in the region 1101 for counter types in the table of displayed counters illustrated in FIG. 11. If that counter type is determined not to be an already-existing counter type (NO in step S1206), flow proceeds to step S1207. If that counter type is determined to be an already-existing counter type (YES in step S1206), flow proceeds to step S1208.

In step S1207, the device information managing portion 303 adds information on the counter type determined not to be an already-existing counter type to the region 1101 of the table illustrated in FIG. 11, and flow then proceeds to step S1208.

In step S1208, the device information managing portion 303 increments a count of devices that set displaying (set devices) in the region 1102 for the currently processed counter type, and flow proceeds to step S1209.

In step S1209, the device information managing portion 303 determines whether the above-described processing from steps S1206 to S1208 has been performed on all the counter types obtained in step S1205. If it is determined that checking of all the counter types has not been completed (NO is step S1209), flow proceeds to step S1206, and the above-described processing is performed again. If it is determined that checking of all the counter types has been completed (YES in step S1209), flow returns to step S1201.

In step S1201, if all target devices have been processed, flow proceeds to step S1210.

In step S1210, the device information managing portion 303 determines the ratio of displaying devices shown in the region 1103 illustrated in FIG. 11 from the relationship between the total number of target devices calculated in step S1202 and the number of set devices in the region 1102 and sets information indicating the determined ratio of displaying devices for all counter types. Then, the process is completed.

Figures 13, 14, 15:
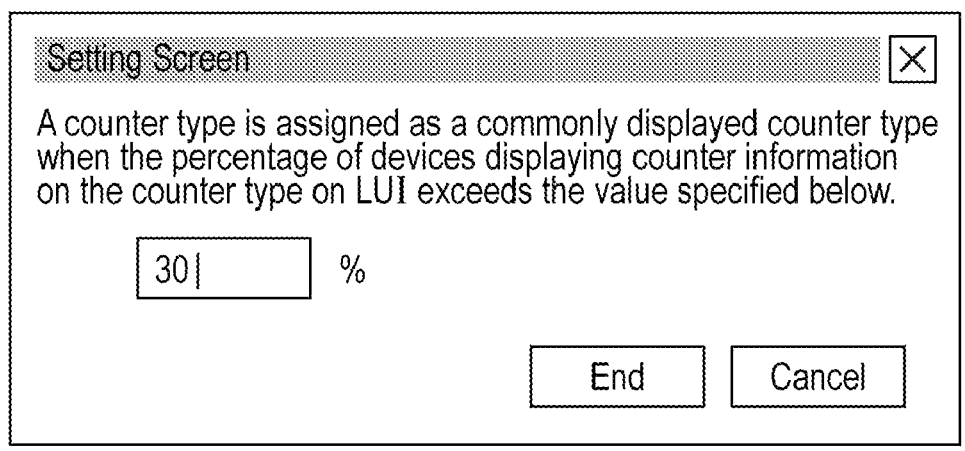
FIG. 13 illustrates an example of a setting screen used for setting a threshold in assigning a counter type as a commonly displayed counter.
FIG. 14 illustrates an example of a table of commonly displayed counters.
FIG. 15 illustrates an example of a table of candidates for commonly displayed counters.

FIG. 13 illustrates an example of a setting screen. On this screen, a threshold used for assigning a counter type as a common counter is set. Specifically, a value is set as the threshold in percentage, and the ratio of displaying device in the region 1103 is compared with this threshold. This screen operates as a part of the device management application 301, and can be displayed at any timing, thus allowing the settings to be changed at any timing. At the time of installation of the device management application 301, a certain value can be set as an initial value. The initial value and set value are stored in the hard disk drive 210, and they are read to memory on the CPU board as necessary in processing described below.

FIG. 14 illustrates a table of commonly displayed counters when, for the table of displayed counters illustrated in FIG. 11, the threshold is set at 30% or more on the setting screen illustrated in FIG. 13. The commonly displayed counters used here indicate displayed counters common to image forming apparatuses.

FIG. 15 illustrates a table of candidates for commonly displayed counters when, for the table of displayed counters illustrated in FIG. 11, the threshold is set at 30% or more on the setting screen illustrated in FIG. 13.

A process for generating the tables illustrated in FIGS. 14 and 15 performed in the management server is described below using the flowchart illustrated in FIG. 16.

In step S1601, the device information managing portion 303 reads a threshold set in the setting screen illustrated in FIG. 13 from, for example, the hard disk drive 210.

In step S1602, the device information managing portion 303 obtains information of the table of displayed counters illustrated in FIG. 11. Here, information assigned in the table of displayed counters, i.e., information on the total number of counter types, the counter types in the region 1101, the number of set devices in the region 1102, and the ratio of displaying devices in the region 1103 can be referred to in the steps described below.

In step S1603, the device information managing portion 303 compares the ratio of displaying devices for one of the counter types assigned in the table of displayed counters illustrated in FIG. 11 (currently processed counter type) with the threshold obtained in step S1601. In step S1604, the device information managing portion 303 determines whether the ratio of displaying devices for the currently processed counter type in the region 1103 is larger than the threshold, on the basis of the comparison in step S1603. If it is determined that the ratio of displaying devices for the currently processed counter type in the region 1103 is larger than the threshold (YES in step S1604), flow proceeds to step S1605. If it is determined that that ratio is equal to or smaller than the threshold (NO in step S1604), flow proceeds to step S1607.

In step S1605, the device information managing portion 303 adds information on the currently processed counter type to the table of commonly displayed counters illustrated in FIG. 14.

In step S1607, the device information managing portion 303 adds information on the currently processed counter type to the table of candidates for commonly displayed counters illustrated in FIG. 15.

In step S1606, the device information managing portion 303 determines whether all counter types in the table of displayed counters illustrated in FIG. 11 in the region 1101 have been processed. If it is determined that an unprocessed counter type remains, flow returns to step S1603, and the above-described processing is performed again. If all counter types have been processed (YES in step S1606), the process is completed.

Figure 16:
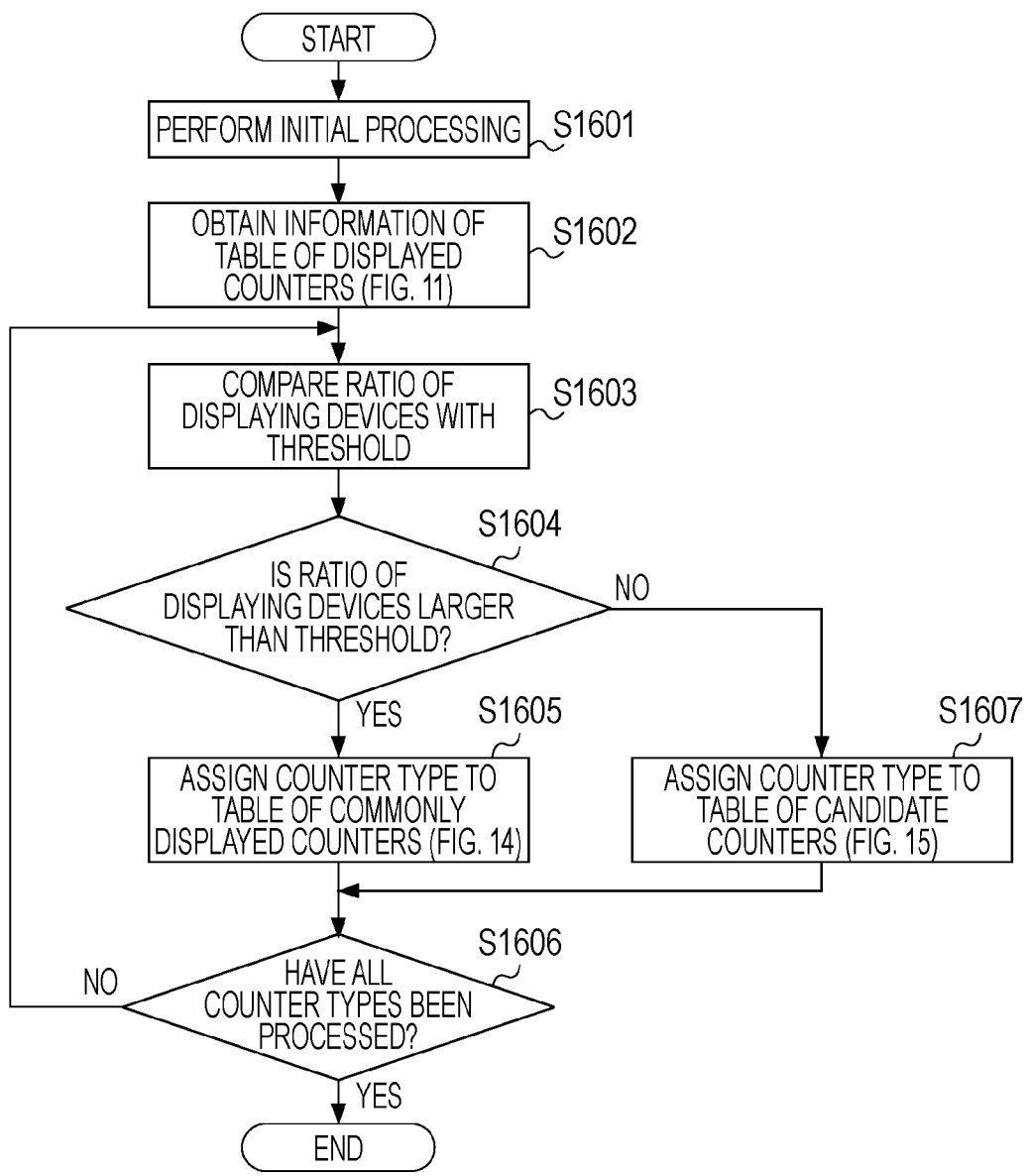
FIG. 16 is a flowchart based on a process for generating a table of commonly displayed counters and a table of candidates for commonly displayed counters.
Figures 17, 18:
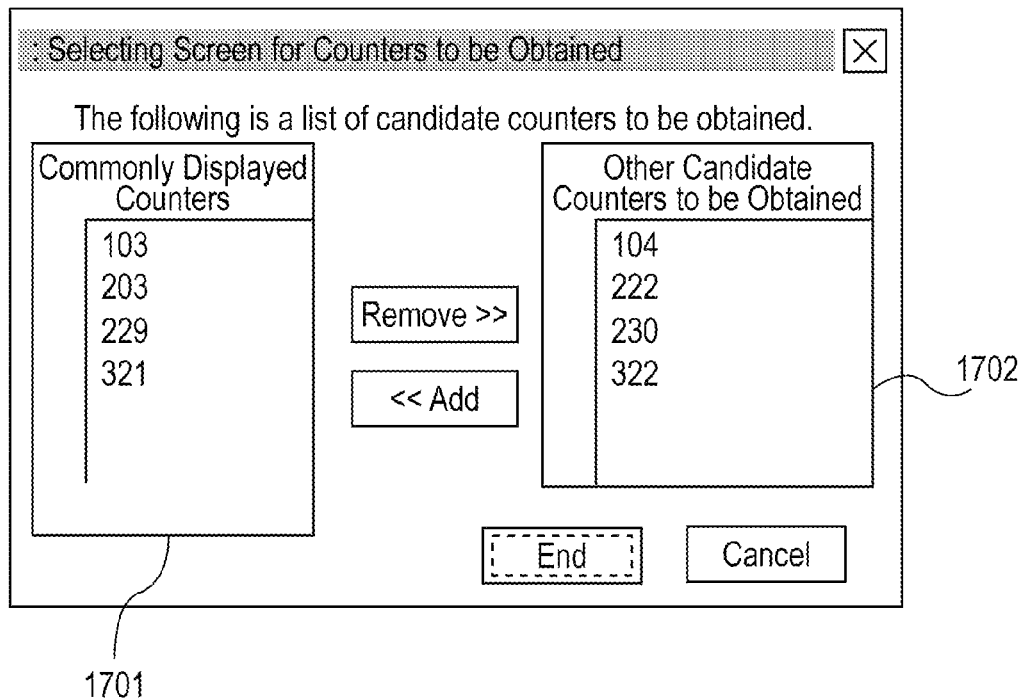
FIG. 17 illustrates an example of an editing screen used for editing a table of commonly displayed counters and a table of candidates for commonly displayed counters to set counter information to be obtained.
FIG. 18 illustrates an example of a substitute information table.

FIG. 17 illustrates an example of a screen that allows a user to check and set a counter type of a commonly displayed counter whose obtainment is shared by all the image forming apparatuses in the system using the information of the commonly displayed counters illustrated in FIG. 14 and the information of the candidates for commonly displayed counters illustrated in FIG. 15 generated in the process illustrated in FIG. 16. The contents illustrated in FIG. 14 are reflected in a region 1701 as an initial value, and the contents illustrated in FIG. 15 are reflected in a region 1702 as an initial value. A counter type to be assigned in the table of commonly displayed counters can be added or deleted by a user operation.

FIG. 18 illustrates an example of a substitute information table. This table defines a second counter type to be obtained as a substitute for a first counter type to be originally obtained when counter information specified by the first counter type is unobtainable from an image forming apparatus. Information of this table may be defined previously at the time of installation of the device management application 301 or may also be changed after by an administrator.

The defined substitute information is stored in the hard disk drive 210 and is read to the memory of the CPU board as necessary in the steps described below. The uppermost record in this table shows an example defined such that counter information is obtained by substituting the total (small) 104 for the total (large) 103. Similar definitions are applied to the other counter types.

Figure 19A:
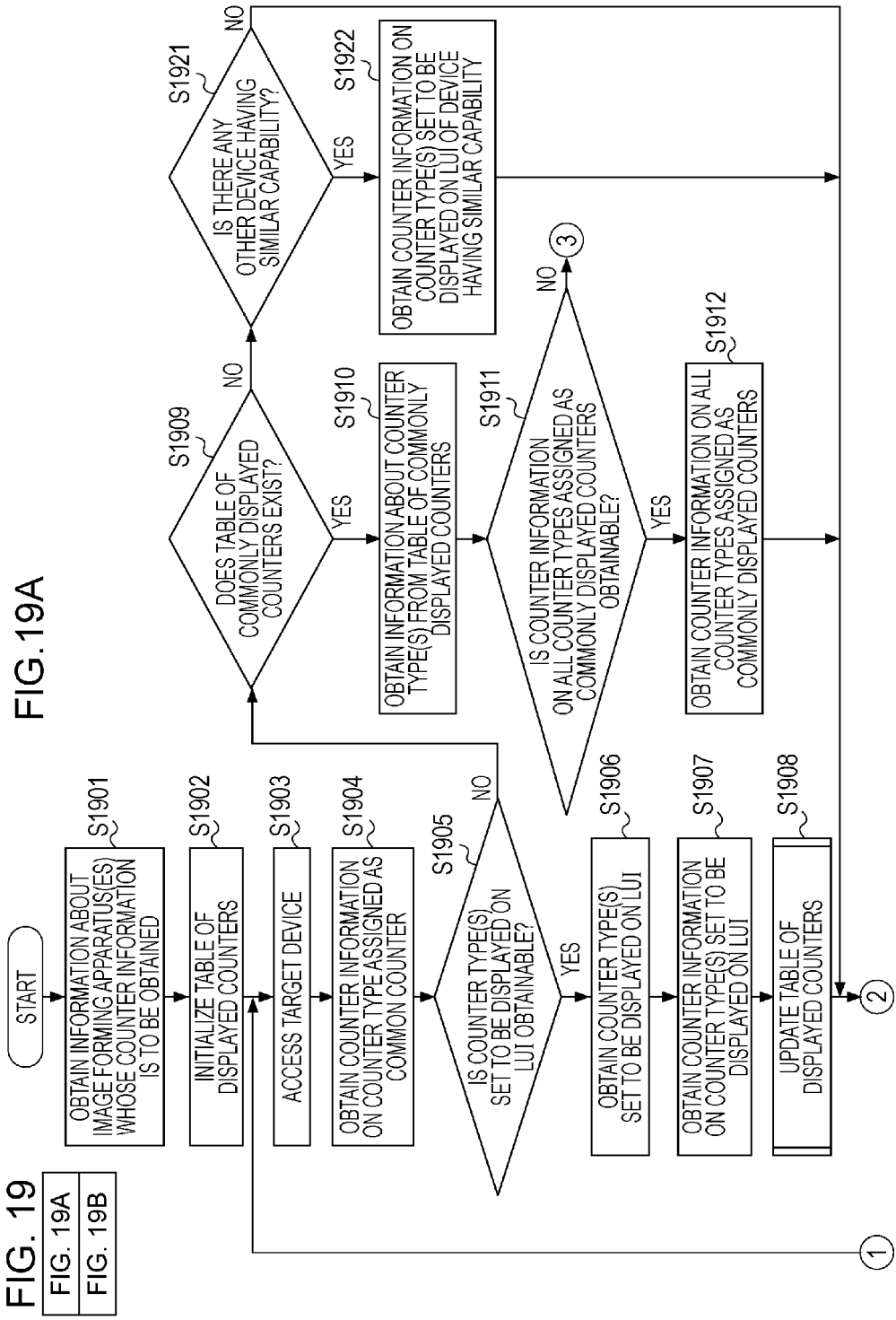
FIG. 19 is a flowchart based on a process for obtaining counter information according to one embodiment of the present invention.

A process for obtaining counter information from an image forming apparatus performed in the management server is described using the flowchart illustrated in FIG. 19.

In step S1901, the device information obtaining portion 302 obtains information about one or more image forming apparatuses (a target-device group) whose counter information is to be obtained. For example, in the system configuration illustrated in FIG. 10, it is assumed that ten devices consisting of the image forming apparatuses 1002 to 1006 and 1008 to 1012 are assigned in target-device groups.

It is also assumed that the device management application 301 is designed so as to perform processing in a task basis. Here, if a task to be executed is obtainment from any target device, the processing of step S1901 is pre-processing for execution of the task and is obtainment of a target device to be set for the task.

In step S1902, the device information managing portion 303 initializes the contents of the table of displayed counters illustrated in FIG. 11 to address an increase or decrease in target devices. In the present embodiment, the contents of the table of displayed counters are initialized every time. However, they may be initialized only after the system configuration is changed, for example, the number of target devices is changed.

In step S1903, the device information obtaining portion 302 accesses a certain image forming apparatus from among the plurality of target devices in the target-device groups. Here, the device information managing portion 303 updates the total number of target devices so as to increment it by one every time a target device is accessed.

In step S1904, the table of common counters illustrated in FIG. 9 is referred to, and counter information on counter types assigned as common counters is obtained.

In step S1905, the device information managing portion 303 determines whether one or more counter types set to be displayed on the LUI of the target device are obtainable. For example, it may be determined using the determination whether the target device accessed in step S1903 belongs to the target-device group 1007 or 1013 illustrated in FIG. 10. Examples of a typical determining method include a method of accessing MIB information of the target device using the simple network management protocol (SNMP) and a method of referring to attribute information of the target device using an original protocol. In step S1905, if it is determined that the counter types set to be displayed on the LUI are obtainable (YES in step S1905), flow proceeds to step S1906. If it is determined that the counter types set to be displayed on the LUI are unobtainable (NO in step S1905), flow proceeds to step S1909.

In step S1906, the device information obtaining portion 302 obtains the counter types set to be displayed on the LUI from the target device. For example, when the target device is the image forming apparatus 1008, information indicating that the counter types 104, 222, 230, and 322 are displayed on the LUI is obtained.

In step S1907, the device information obtaining portion 302 obtains counter information on the counter types set to be displayed on the LUI from the target device.

In step S1908, the device information managing portion 303 updates the contents of the table of displayed counters illustrated in FIG. 11 using the information obtained in step S1906. The details of the updating process correspond to steps S1206 to S1209 in the previously described process illustrated in FIG. 12.

In step S1905, if it is determined that the counter types set to be displayed on the LUI are unobtainable (NO in step S1905), flow proceeds to step S1909, where the device information managing portion 303 determines whether the table of commonly displayed counters illustrated in FIG. 14 generated in the previous processing exists. If it is determined that no table of commonly displayed counters exists (NO in step S1909), flow proceeds to step S1921. If it is determined that the table of commonly displayed counters exists (YES in step S1909), flow proceeds to step S1910.

The fact that flow has proceeded to step S1909 can result in the determination in which a device contained in the target-device group 1007 illustrated in FIG. 10 is being processed.

In step S1910, the device information managing portion 303 obtains information of the table of commonly displayed counters illustrated in FIG. 14. Specifically, counter types that will be set to be displayed on the LUI are obtained.

In step S1911, the device information managing portion 303 determines whether counter information on all counter types assigned in the table of commonly displayed counters obtained in step S1910 is obtainable from the currently processed target device. If it is determined that the counter information on all the counter types is obtainable (YES in step S1911), flow proceeds to step S1912. If it is determined that at least a part of the counter information on all the counter types is unobtainable (NO in step S1911), flow proceeds to step S1913.

In step S1912, the device information obtaining portion 302 obtains counter information on all of the counter types assigned as the commonly displayed counters from the target device, and the device information managing portion 303 retains and manages it.

In step S1913, the device information obtaining portion 302 first obtains counter information corresponding to an obtainable counter type from among the counter types assigned as commonly displayed counters, from the target device.

In step S1914, the device information managing portion 303 obtains the contents of the substitute information table illustrated in FIG. 18 (substitute information).

In step S1915, the device information managing portion 303 refers to the table of candidates for commonly displayed counters illustrated in FIG. 15 and narrows down the substitute information obtained in step S1914. Specifically, if, among a plurality of information items assigned in the substitute information table, a counter type that would substitute is not assigned in the table of candidates for commonly displayed counters, the substitute information thereof is not used.

The processing of steps S1914 and S1915 disables obtainment of a counter type that is not set to be displayed in any of the image forming apparatuses in the target-device group 1013 illustrated in FIG. 10. As a result, this enables acquisition of only counter information matching a usage state of the system.

In step S1916, the device information managing portion 303 determines whether the counter type determined to be unobtainable in step S1911 is substitutable, from the substitute information narrowed in the preceding step. If it is determined that the counter type is substitutable (YES in step S1916), flow proceeds to step S1917. If it is determined that the counter type is not substitutable (NO in step S1916), flow proceeds to step S1923.

Figure 20:
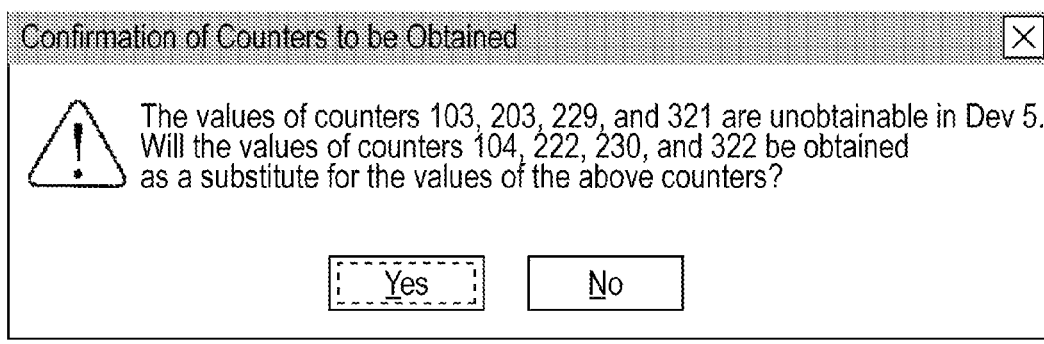
FIG. 20 illustrates an example of a confirmation message for substitution for a counter type.

In step S1917, the device information managing portion 303 displays a confirmation message asking whether to make a substitution of the counter type, as illustrated in FIG. 20, on the CRT 207.

In step S1918, the device information managing portion 303 determines a response input from a user to the confirmation message displayed in step S1917. If the substitution of the counter type is selected ("YES" is selected), flow proceeds to step S1919. If the substitution of the counter type is deselected ("NO" is selected), flow proceeds to step S1921.

In step S1919, the device information managing portion 303 substitutes a counter type to be obtained. In step S1920, the device information obtaining portion 302 obtains counter information on the counter type that substituted for, from the target device.

In step S1921, it is determined whether there is any other image forming apparatus having similar capability (function) to that in the currently processed target device, for example, the size of a cassette for usable sheets or color/monochrome function in the target-device group 1013 illustrated in FIG. 10. The functions included in the image forming apparatuses in the system are managed in the HD so as to be readable and writable by the device information managing portion 303 in association with the respective image forming apparatuses. If it is determined that there is an image forming apparatus having similar capability in the target-device group 1013 (YES in step S1921), flow proceeds to step S1922.

In step S1922, the device information obtaining portion 302 obtains the counter type(s) set to be displayed on the LUI from the image forming apparatus determined to have similar capability to that in the target device in the target-device group 1013 illustrated in FIG. 10. The device information obtaining portion 302 also obtains counter information corresponding to the counter type(s) from the target device.

The processing of steps S1921 and S1922 enables obtainment of proper counter information even if a table of commonly displayed counters is not managed in the case where an image forming apparatus contained in the target-device group 1007 illustrated in FIG. 10 is a target device whose counter information is to be obtained.

In step S1923, the device information managing portion 303 determines whether there is an image forming apparatus whose counter information has not yet been obtained in the target-device groups. If it is determined that there is an image forming apparatus whose counter information has not yet been obtained (YES in step S1923), flow returns to step S1903, and the above steps are performed again. If it is determined that counter information has been obtained from all the target-device groups, flow proceeds to step S1924.

In step S1924, the device information managing portion 303 calculates the ratio of displaying devices in the region 1103 on the basis of the number of target devices counted in step S1903 and the number of set devices in the region 1102 and sets information on the ratio of displaying devices for all the counter types.

In step S1925, the device information managing portion 303 obtains the threshold input in the setting screen illustrated in FIG. 13.

In step S1926, the device information managing portion 303 determines whether there is any counter type that has a ratio of displaying devices that exceeds the threshold obtained in step S1925 with reference to the contents of FIG. 11. If it is determined that there is a counter type to be assigned as a commonly displayed counter (YES in step S1926), flow proceeds to step S1927, where the device information managing portion 303 updates the table of commonly displayed counters illustrated in FIG. 14. If it is determined that there is no counter type to be assigned as a commonly displayed counter (NO in step S1926), flow proceeds to step S1928.

In step S1928, a screen for allowing editing of a counter type assigned as a commonly displayed counter, as illustrated in FIG. 17, is displayed, thus providing a state that allows the settings of commonly displayed counters.

In step S1929, the device information managing portion 303 determines whether information on the commonly displayed counters was changed in step S1928. If it is determined that the information was changed (YES in step S1929), flow proceeds to step S1930; if not (NO in step S1929), the process is completed.

In step S1930, the device information managing portion 303 updates the table of commonly displayed counters illustrated in FIG. 14 and the table of candidates for commonly displayed counters illustrated in FIG. 15. Then, the process is completed.

FIG. 21 illustrates an example of a table of acquired counter information items for the system illustrated in FIG. 10 obtained through the process of obtaining counter information described with the flowchart illustrated in FIG. 19.

Information on the counter types 101 to 201 is counter information obtained on the basis of the table of common counters (FIG. 9). Information on the counter types 103 to 321 is counter information obtained on the basis of the table of commonly displayed counters (FIG. 14). Information on the counter types 104 to 322 is information obtained on the basis of the table of candidates for commonly displayed counters (FIG. 15) and the substitute information table (FIG. 18).

Through the above-described processing, even if an image forming apparatus whose counter type set to be displayed on the LUI is unobtainable is contained in target devices, counter information corresponding to that in an image forming apparatus whose counter type set to be displayed on the LUI is obtainable can be obtained.

Accordingly, the present invention can obtain counter information that has a proper amount and can adjust to a usage state of a system more flexibly than a structure in which all counter information obtainable in each of image forming apparatuses are obtained from all the image forming apparatuses or only predetermined counter information is obtained from all the image forming apparatuses.

Various embodiments are described above. The present invention is applicable to a system including a plurality of devices or an apparatus consisting of a single device. For example, the present invention is applicable to a printer, a facsimile machine, a PC, a computer system including a server and a client.

The present invention can also be achieved by supplying a software program attaining the functions of at least one of the embodiments described above directly or remotely to a system or an apparatus and reading and executing program code by a computer included in the system or the like.

Program code itself installed in an information processing apparatus to achieve the function and processing in at least one of the embodiments of the present invention can also achieve the present invention. A computer program itself for achieving the above function and processing can be one aspect of the present invention.

In this case, it may have any program form, such as object code, a program executed by an interpreter, and scrip data supplied to the OS, as long as it has the function of a program.

Examples of a storage medium for supplying a program include a flexible disk, a hard disk, an optical disk, a magneto-optical disk (MO), a compact-disk read-only memory (CD-ROM), a compact disk recordable (CD-R), and a CD-rewritable (CD-RW). Other examples are magnetic tape, a nonvolatile memory card, a ROM, and a digital versatile disk (DVD), including a DVD-ROM and a DVD-R.

A program can be downloaded from a web site on the Internet by use of a browser in a client information processing apparatus. That is, a computer program itself or a compressed file with an automatic installer can be downloaded into a storage medium, such as a hard disk, from the web site. Program code constituting a program of the present invention can be divided into files, and the files can be downloaded from different web sites. That is, a world wide web (WWW) server that allows a plurality of users to download a program file for achieving the functional processing of the present invention by use of execution by a computer can also be included in a component of the present invention.

A program of the present invention can be encrypted and stored in storage media, such as CD-ROMs, and the storage media can be distributed to users. In this case, only a user who satisfies a predetermined condition can be allowed to download key information for decoding encryption from a web site over the Internet, an encrypted program can be decoded using the key information, the program can be executed, and the program can be installed in an information processing apparatus.

The functions of at least one of the above embodiments can also be achieved by execution of a read program by a computer. Actual processing in part or in entirety can be performed in accordance with instructions of that program by, for example, an OS running on a computer. Also in this case, the functions of at least one of the above embodiments can be achieved.

A program read from a storage medium can also be written in memory included in a function expansion board inserted into an information processing apparatus or in a function expansion unit connected to the information processing apparatus. Actual processing in part or in entirety can be performed in accordance with instructions of that program by, for example, a CPU included in the function expansion board or the function expansion unit. In such a manner, the functions of at least one of the above embodiments can be achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-328723 filed Dec. 20, 2007, which is hereby incorporated by reference herein in its entirety.

What is claimed is:

1. A management apparatus capable of communicating with a plurality of image forming apparatuses that includes a display portion and that allows a user to observe, on the display portion, counter information for a counter type set to be displayed therein, the management apparatus comprising:
   a counter information obtaining unit configured to obtain, from the plurality of image forming apparatuses, counter information for a counter type set to be displayed on the display portion of each of the plurality of image forming apparatuses; and
   a specifying unit configured to specify a counter type of counter information to be obtained from an inhibited image forming apparatus on the basis of a counter type obtained from a non-inhibited image forming apparatus, wherein the non-inhibited image forming apparatus allows obtainment of the counter type set to be displayed therein and the inhibited image forming apparatus does not allow obtainment of the counter type set to be displayed therein, and
   wherein the counter information obtaining unit is configured to obtain the counter information for the counter type specified by the specifying unit from the inhibited image forming apparatus.

2. The management apparatus according to claim 1, further comprising:
   a counter type obtaining unit configured to obtain the counter type from the non-inhibited image forming apparatus,
   wherein the counter information obtaining unit is configured to obtain counter information for the counter type obtained by the counter type obtaining unit from the non-inhibited image forming apparatus.

3. The management apparatus according to claim 1, wherein the counter information obtaining unit is configured to obtain counter information for a common counter type to be obtained commonly from the plurality of image forming apparatuses.

4. The management apparatus according to claim 1, wherein the specifying unit is configured to specify, from among a plurality of counter types obtained from a plurality of non-inhibited image forming apparatuses from which counter types set to be displayed therein are determined to be obtainable, a counter type when a ratio of image forming apparatuses that set displaying of the counter type to the plurality of non-inhibited image forming apparatuses exceeds a predetermined threshold as the counter type for counter information to be obtained from the inhibited image forming apparatus.

5. The management apparatus according to claim 1, further comprising an assigning unit configured to assign, as a commonly displayed counter, the counter type specified by the specifying unit.

6. The management apparatus according to claim 5, wherein the assigning unit is configured to assign, as a candidate counter, a counter type that is not specified by the specifying unit as the counter type of counter information to be obtained from the inhibited image forming apparatus from among a plurality of counter types obtained from a plurality of non-inhibited image forming apparatuses.

7. The management apparatus according to claim 6, further comprising a display unit configured to display a screen for enabling the user to observe the counter type assigned as the commonly displayed counter and the counter type assigned as the candidate counter by the assigning unit and to edit a counter type to be assigned as the commonly displayed counter.

8. The management apparatus according to claim 1, further comprising a substituting unit configured to, when counter information for a counter type that the counter information obtaining unit attempts to obtain is unobtainable from the inhibited image forming apparatus, substitute a different counter type for the counter type of the unobtainable counter information,
wherein the counter information obtaining unit is configured to obtain counter information for the counter type substituted for by the substituting unit from the inhibited image forming apparatus.

9. The management apparatus according to claim 1, further comprising a managing unit configured to manage a plurality of image forming apparatuses and their respective functions in association with each other,
wherein the counter information obtaining unit is configured to obtain, from the inhibited image forming apparatus, counter information for a counter type set to be displayed in a similar image forming apparatus that has a similar function to a function of the inhibited image forming apparatus from among the plurality of image forming apparatuses managed by the managing unit.

10. The management apparatus according to claim 9, wherein the function of each of the image forming apparatuses managed by the managing unit comprises a size of sheets usable in the image forming apparatus and a color capability.

11. An information processing method for use in a management apparatus capable of communicating with a plurality of image forming apparatuses that includes a display portion and that allows a user to observe, on the display portion, counter information for a counter type set to be displayed therein, the information processing method comprising:
obtaining, from the plurality of image forming apparatuses, counter information for a counter type set to be displayed on the display portion of each of the plurality of image forming apparatuses and
specifying a counter type of counter information to be obtained from an inhibited image forming apparatus on the basis of a counter type obtained from a non-inhibited image forming apparatus,
wherein the non-inhibited image forming apparatus allows obtainment of the counter type set to be displayed therein and the inhibited image forming apparatus does not allow obtainment of the counter type set to be displayed therein, and wherein, in the obtaining the counter information, the counter information for the counter type specified in the specifying the counter type is obtained from the inhibited image forming apparatus.

12. The information processing method according to claim 11, further comprising:
obtaining the counter type from the non-inhibited image forming apparatus,
wherein, in the obtaining the counter information, counter information for the counter type obtained in the obtaining the counter type is obtained from the non-inhibited image forming apparatus.

13. The information processing method according to claim 11, wherein, in the obtaining the counter information, counter information for a common counter type to be obtained commonly is obtained from the plurality of image forming apparatuses.

14. The information processing method according to claim 11, wherein, in the specifying the counter type, from among a plurality of counter types obtained from a plurality of non-inhibited image forming apparatuses from which counter types set to be displayed therein are determined to be obtainable, a counter type when a ratio of image forming apparatuses that set displaying of the counter type to the plurality of non-inhibited image forming apparatuses exceeds a predetermined threshold is specified as the counter type for counter information to be obtained from the inhibited image forming apparatus.

15. The information processing method according to claim 11, further comprising assigning, as a commonly displayed counter, the counter type specified in the specifying the counter type.

16. The information processing method according to claim 15, wherein, in the assigning the counter type, a counter type that is not specified in the specifying the counter type as the counter type of counter information to be obtained from the inhibited image forming apparatus from among a plurality of counter types obtained from a plurality of non-inhibited image forming apparatuses is assigned as a candidate counter.

17. The information processing method according to claim 16, further comprising displaying a screen for enabling the user to observe the counter type assigned as the commonly displayed counter and the counter type assigned as the candidate counter in the assigning the counter type and for editing a counter type to be assigned as the commonly displayed counter.

18. The information processing method according to claim 11, further comprising when counter information for a counter type that is attempted to be obtained in the obtaining the counter information is unobtainable from the inhibited image forming apparatus, substituting a different counter type for the counter type of the unobtainable counter information,
wherein, in the obtaining the counter information, counter information for the counter type substituted for in the substituting the counter type is obtained from inhibited the image forming apparatus.

19. The information processing method according to claim 11, further comprising managing a plurality of image forming apparatuses and their respective functions in association with each other,
wherein, in the obtaining the counter information, from the inhibited image forming apparatus, counter information for a counter type set to be displayed in a similar image forming apparatus that has a similar function to a function of the inhibited image forming apparatus from among the plurality of image forming apparatuses managed in the managing the plurality of image forming apparatuses and their respective functions is obtained.

20. A non-transitory computer-readable medium containing computer-executable instructions for use in a management apparatus capable of communicating with a plurality of image forming apparatus that includes a display portion and that allows a user to observe, on the display portion, counter information for a counter type set to be displayed therein, the medium comprising:

computer-executable instructions for obtaining counter information, from the plurality of image forming apparatuses, for a counter type set to be displayed on the display portion of each of the plurality of image forming apparatuses; and computer-executable instructions for specifying a counter type of counter information to be obtained from an inhibited image forming apparatus on the basis of a counter type obtained from a non-inhibited image forming apparatus, wherein the non-inhibited image forming apparatus allows obtainment of the counter type set to be displayed therein and the inhibited image forming apparatus does not allow obtainment of the counter type set to be displayed therein, and wherein, in the obtaining the counter information, the counter information for the counter type specified in the specifying the counter type is obtained from the inhibited image forming apparatus.

* * * * *